April 5, 1927.

J. W. NAPIER 1,623,064

COUPLING AND METHOD OF MAKING THE SAME

Filed June 10, 1925

WITNESSES:

INVENTOR
James W. Napier
BY
ATTORNEY

Patented Apr. 5, 1927.

1,623,064

UNITED STATES PATENT OFFICE.

JAMES W. NAPIER, OF McKEESPORT, PENNSYLVANIA.

COUPLING AND METHOD OF MAKING THE SAME.

Application filed June 10, 1925. Serial No. 36,122.

My invention relates to pipe couplings and particularly to steel couplings.

One object of my invention is to provide a method of constructing pipe couplings and similar articles from screw stock or hot short steel.

Another object of my invention is to provide a steel coupling that shall be constructed of such high sulphur content steel that it will be easily machinable and less likely to gall in use.

Another object of my invention is to provide a method of welding screw stock which will effect a joint without oxidizing or otherwise destroying the steel.

Another object of my invention is to provide a coupling that shall be constructed from sheared bars having the desired cross section of the finished coupling.

Another object of my invention is to provide a coupling that may be tapped without the necessity of boring the same to obtain tapered openings.

Another object of my invention is to provide a pipe coupling constructed of two semi-cylindrical members that are relatively easily formed.

A further object of my invention is to provide a steel coupling that is cheap to construct, that will not gall and that will have the desired strength.

Heretofore pipe couplings when made of steel were very expensive and often a source of great trouble by reason of the tendency of such couplings to gall or strip their threads when fitted to a steel pipe. The steel couplings of the prior art, were made of low sulphur content bar steel because the method of fire welding used destroyed all other types of steel. However such steel is difficult to thread and the threads are so rough as to permit ready galling with the attendant stripping of the threads.

My present invention contemplates the production of a steel pipe coupling which is made of screw stock steel which is easily threaded or machined and which produces a thread which substantially precludes galling.

In view of the fact that such steel is of relatively high sulphur content it has been difficult to weld but I have found that it can be satisfactorily welded by the flash, percussive or contact flash processes of electric welding which processes only heat the surface of contact and, consequently, do not destroy or burn the metal thereby producing a strong weld.

With my method we obtain a relatively cheap coupling or similar device which can be easily threaded or machined and which is sufficiently strong for all applications.

In the accompanying drawings, Figs. 1 and 2 are two diagrammatic views of dies for forming a coupling in accordance with my invention.

Figure 1:
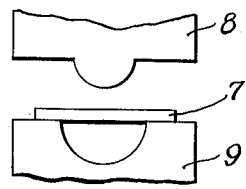
Figure 2:
Figure 3:
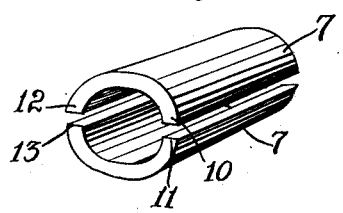
Fig. 3 is a perspective view of one form of coupling before welding embodying my invention.
Figure 4:
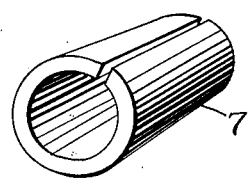
Fig. 4 is a perspective view of another form of coupling before welding embodying my invention.

In the construction of a coupling or other tubular member by my invention I place a bar or plate 7 of relatively high sulphur content such as .065 or higher, commonly called screw stock, in a press having two dies 8 and 9 which are of such shape that when they are brought together as shown in Fig. 2 of the drawings the bar 7 is curved. The bar 7 will be curved by this process to form a semicylindrical member as shown in Fig. 3, or it may be formed into a cylindrical member as shown in Fig. 4 by any desired rolling or forming method.

When the member 7 is formed to the desired shape it is disposed in a welding machine or otherwise welded in such manner that the metal of the bar 7 is not oxidized or destroyed during the process of welding. This may be accomplished in a non-oxidizing atmosphere or preferably by the flash, percussive or contact flash methods of electric welding.

The flash method consists in connecting the terminals of an electric welder (not shown) to the ends 10 and 11, and then to the ends 12 and 13 to be welded before they are brought into engagement. The voltage is sufficiently high to heat the surfaces so that when the ends are brought into engagement with pressure they adhere. This method of welding does not heat the body of the metal sufficiently to cause burning which would be the case with fire welding as high sulphur content steel burns easily.

The ends may, of course, be welded by the percussive or the contact flash method also or by any other method which localizes the heat.

It is well known that steel having a high sulphur content such as above .065 is not suitable for welding by the usual fire welding methods but it is excellent for machining and it produces a smooth cut which is excellent for threading as it decreases the tendency to gall. Furthermore, it may be machined more quickly and easily than ordinary low sulphur content steel and, consequently, the cost of constructing is decidedly reduced. By my method I can greatly reduce the cost of couplings while at the same time I provide a coupling which is more satisfactory than those hereto made by reason of the removal of the tendency to gall.

Figure 5:
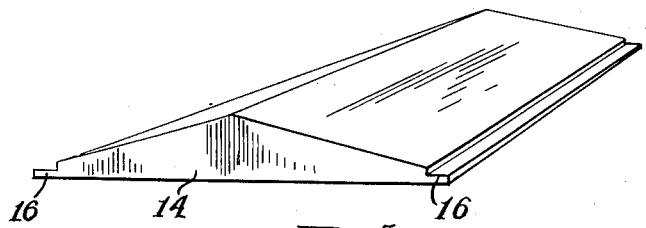
Fig. 5 is a perspective view of a shaped bar from which still another form of coupling embodying my invention may be constructed.

It is usual in such couplings to bore a tapered hole in each end of the coupling and then tap the same. This is quite expensive and to obviate this expense I have provided a bar 14, as shown in Fig. 5, of triangular shape with or without cut away portions 16 at the edges.

Figure 6:
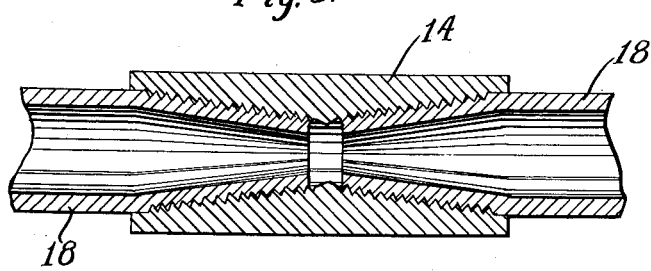
Fig. 6 is a longitudinal sectional view of a coupling constructed from the bar shown in Fig. 5.

When the bar 14 is formed between the dies 8 and 9 it forms a structure substantially as shown in Fig. 6 that is tapered towards its center portion. These surfaces may be easily tapped to receive the screw threaded ends of a pipe 18. The cut away portions 16 protect the screw threads in the coupling from damage.

The bar 14 is, of course, made of high sulphur content steel and it is welded after forming by the flash process.

It is conceivable that the electrical energy may be applied to the bar while in the press so that it is welded before removing it from the press, thus greatly reducing the cost of construction.

I believe that I have provided an entirely new method of making couplings which are superior to any heretofore constructed but I do not limit my invention to couplings as it has application to any cylindrical member that it is desired to easily machine. Consequently, my invention is not limited to the devices shown and described herein but may be variously modified as set forth in the appended claims.

I claim as my invention:

1. The method of manufacturing a steel pipe coupling which comprises forming steel bar material of relatively high sulphur content into a clyinder, flash welding the opposing ends of the said material, and threading the interior surface of the welded cylinder.

2. The method of manufacturing a steel pipe coupling which comprises forming steel bar material of not substantially below .065% sulphur content into a cylinder, flash welding the opposing ends of the said material, and threading the interior surface of the welded cylinder.

3. The method of manufacturing a steel pipe coupling which comprises rolling a steel bar of relatively high sulphur content into bars each having longitudinally thereof a ridge centrally between the sides thereof toward which the bars are gradually thinned from the ridge, cutting the bars into suitable lengths, arcuately curving the lengths transversely of the said ridge with the latter on the concave surfaces thereof, and forming cylindrical shapes therefrom, flash welding the opposing ends of the lengths, and threading the tapered interior of each welded cylinder.

4. The method of manufacturing a steel pipe coupling which comprises rolling a steel bar of not substantially below .065 sulphur content into bars each having longitudinally thereof a ridge centrally between the sides thereof toward which the bars are gradually thinned from the ridge, cutting the bars into suitable lengths, arcuately curving the lengths transversely of the said ridge with the latter on the concave surfaces thereof, and forming cylindrical shapes therefrom, flash welding the opposing ends of the lengths, and threading the tapered interior of each welded cylinder.

5. The method of manufacturing a steel pipe coupling which comprises rolling a steel bar of relatively high sulphur content into bars each having longitudinally thereof a ridge centrally between the sides thereof toward which the bars are gradually thinned from the ridge, simultaneously rolling a recess along each edge on that face of each bar which has the ridge, cutting the bars into suitable lengths, arcuately curving the lengths transversely of the said ridge with the latter on the concave surfaces thereof, and forming cylindrical shapes therefrom, flash welding the opposing ends of the lengths, and threading the tapered interior of each welded cylinder.

6. The method of making a pipe coupling which consists in forming a cylindrical member from sheared arcuately-shaped bar of screw stock material of substantially the same cross-sectional shape as the cross-sectional shape of the coupling, electrically welding the ends together, and then threading the interior surface of the welded cylinder.

7. The method of manufacturing a pipe coupling which consists in bending a single piece of ferrous bar material into a cylinder, flash welding the opposing ends of the said material, and threading the interior surface of the welded cylinder.

8. The method of manufacturing a pipe coupling which consists in bending a single piece of steel bar material into a cylinder, flash welding the opposing ends of the said material, and threading the interior surface of the welded cylinder.

9. The method of manufacturing a pipe coupling which consists in bending a single piece of screw stock material into a cylinder, flash welding the opposing ends of the said material, and threading the interior surface of the welded cylinder.

10. A cylindrical welded steel pipe-coupling blank ready for interior threading containing not substantially less than .065% of sulphur.

In testimony whereof, I have hereunto subscribed my name this 6th day of June, 1925.

JAMES W. NAPIER.